United States Patent
Guo

(10) Patent No.: US 10,462,130 B2
(45) Date of Patent: Oct. 29, 2019

(54) AUTHENTICATION METHOD AND DEVICE

(71) Applicant: Tencent Technology (Shenzhen) Company Limited, Shenzhen (CN)

(72) Inventor: Xiaolong Guo, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 194 days.

(21) Appl. No.: 15/630,778

(22) Filed: Jun. 22, 2017

(65) Prior Publication Data

US 2017/0295175 A1    Oct. 12, 2017

Related U.S. Application Data

(63) Continuation of application No. PCT/CN2016/076983, filed on Mar. 22, 2016.

(30) Foreign Application Priority Data

Apr. 17, 2015   (CN) .......................... 2015 1 0184551

(51) Int. Cl.
  *H04L 29/06*   (2006.01)
  *H04L 29/08*   (2006.01)

(52) U.S. Cl.
  CPC .......... *H04L 63/0861* (2013.01); *H04L 29/06* (2013.01); *H04L 63/0853* (2013.01); *H04L 67/10* (2013.01); *H04L 67/141* (2013.01)

(58) Field of Classification Search
  CPC ... H04L 63/0861; H04L 67/10; H04L 67/141; H04L 63/0853
  See application file for complete search history.

(56) References Cited

U.S. PATENT DOCUMENTS

2008/0034411 A1* 2/2008 Aoyama ............... G06F 21/305
                                                              726/5
2012/0032782 A1* 2/2012 Colella ................ G06Q 20/385
                                                              340/5.83
(Continued)

FOREIGN PATENT DOCUMENTS

CN      103457951 A      12/2013
CN      103475476 A      12/2013
(Continued)

OTHER PUBLICATIONS

Yang et al., "ATM terminal design is based on fingerprint recognition", 2010 2nd International Conference on Computer Engineering and Technology, Date of Conference: Apr. 16-18, 2010.*
(Continued)

*Primary Examiner* — Morshed Mehedi
(74) *Attorney, Agent, or Firm* — Morgan, Lewis & Bockius LLP

(57) ABSTRACT

An account authentication method performed at a server, including: receiving a login request sent by an initiating terminal; searching, among binding relationships between initiating terminal identifiers, authentication terminal identifiers, and registered biological characteristic information according to the first terminal's identifier, a matching target binding relationship; when found, sending an authentication request to an authentication terminal corresponding to an authentication terminal identifier; receiving biological characteristic information that is sent by the authentication terminal, and determining, through comparison, whether the biological characteristic information is consistent with registered biological characteristic information included in the target binding relationship; and if so, authenticating the login request.

14 Claims, 6 Drawing Sheets

(56) References Cited

U.S. PATENT DOCUMENTS

| | | | |
|---|---|---|---|
| 2012/0204032 A1* | 8/2012 | Wilkins | H04L 9/006 713/170 |
| 2014/0331060 A1 | 11/2014 | Hayton | |
| 2015/0033305 A1* | 1/2015 | Shear | G06F 21/45 726/11 |
| 2015/0046990 A1* | 2/2015 | Oberheide | G06F 21/32 726/6 |
| 2015/0170660 A1* | 6/2015 | Han | G10L 19/018 700/94 |
| 2015/0381621 A1* | 12/2015 | Innes | G06F 21/31 726/7 |

FOREIGN PATENT DOCUMENTS

| | | |
|---|---|---|
| CN | 104202306 A | 12/2014 |
| CN | 104468464 A | 3/2015 |

OTHER PUBLICATIONS

Tencent Technology, ISRWO, PCT/CN2016/076983, Jun. 15, 2016, 8 pgs.

Tencent Technology, IPRP, PCT/CN2016/076983, Oct. 17, 2017, 7 pgs.

\* cited by examiner

AUTHENTICATION METHOD AND DEVICE

PRIORITY CLAIM AND RELATED APPLICATION

This application is a continuation application of PCT Patent Application No. PCT/CN2016/076983, entitled "IDENTITY VERIFICATION METHOD AND DEVICE" filed on Mar. 22, 2016, which claims priority to Chinese Patent Application No. 201510184551.2, entitled "AUTHENTICATION METHOD AND DEVICE" filed on Apr. 17, 2015, both of which are incorporated by reference in their entirety.

FIELD OF THE TECHNOLOGY

The present disclosure relates to the field of Internet technologies, and in particular, to an authentication method and device.

BACKGROUND OF THE DISCLOSURE

Currently, authentication of a network user is carried out in a conventional manner of using a user name and a password. Websites, PC clients, and APPs have their own authentication platforms. Therefore, a user needs to remember a pair of user name and password wherever authentication is needed. If all pairs of user names and passwords are different, there are so many user names and passwords that it is difficult for the user to remember these user names and passwords, and those not frequently used may be forgotten. If the user uses a same user name and password everywhere, when an account somewhere is cracked up due to security reasons, it means that accounts everywhere are cracked up, and a cracker may conveniently log into all registered websites by using the accounts of the user. Accounts such as accounts for online games and finance-related accounts involve security of virtual property and capital. Once such an account is cracked up, a serious result may be caused.

SUMMARY

Embodiments of the present application disclose an authentication method and device, which can effectively improve authentication security.

According to a first aspect, an embodiment of the present application discloses an authentication method, including:

receiving a login request sent by an initiating terminal, the login request including a first initiating terminal identifier of the initiating terminal;

searching, among binding relationships between initiating terminal identifiers, authentication terminal identifiers, and registered biological characteristic information according to the first terminal identifier, a target binding relationship matching the first initiating terminal identifier;

when the target binding relationship exists, sending an authentication request to an authentication terminal corresponding to an authentication terminal identifier included in the target binding relationship;

receiving biological characteristic information that is sent by the authentication terminal in response to the authentication request, and determining, through comparison, whether the biological characteristic information is consistent with registered biological characteristic information included in the target binding relationship; and when the biological characteristic information is consistent with the registered biological characteristic information, authenticating the login request.

According to a second aspect, an embodiment of the present application discloses an authentication device, including:

a receiving module, configured to receive a login request sent by an initiating terminal, the login request including a first initiating terminal identifier of the initiating terminal;

a searching module, configured to search, among binding relationships between initiating terminal identifiers, authentication terminal identifiers, and registered biological characteristic information according to the first terminal identifier, a target binding relationship matching the first initiating terminal identifier;

a sending module, configured to: if a searching result of the searching module indicates that the target binding relationship exists, send an authentication request to an authentication terminal corresponding to an authentication terminal identifier included in the target binding relationship, the receiving module being further configured to receive biological characteristic information that is sent by the authentication terminal in response to the authentication request;

a comparison module, configured to determine, through comparison, whether the biological characteristic information is consistent with registered biological characteristic information included in the target binding relationship; and a determining module, configured to: if a comparison result of the comparison module indicates that the biological characteristic information is consistent with the registered biological characteristic information, authenticate the login request.

By implementing the embodiments of the present application, the following beneficial effects can be realized:

A login request sent by an initiating terminal is received, where the login request includes a first initiating terminal identifier of the initiating terminal; binding relationships between initiating terminal identifiers, authentication terminal identifiers, and registered biological characteristic information are searched according to the first terminal identifier, a target binding relationship matching the first initiating terminal identifier; when the target binding relationship exists, an authentication request is sent to an authentication terminal corresponding to an authentication terminal identifier included in the target binding relationship; biological characteristic information sent by the authentication terminal in response to the authentication request is received, and it is determined, through comparison, whether the biological characteristic information is consistent with registered biological characteristic information included in the target binding relationship: and when the biological characteristic information is consistent with the registered biological characteristic information, it is determined that authentication succeeds. In this way, authentication security is improved.

BRIEF DESCRIPTION OF THE DRAWINGS

To describe the technical solutions of the embodiments of the present application or the existing technology more clearly, the following briefly describes the accompanying drawings required for describing the embodiments or the existing technology. Apparently, the accompanying drawings in the following description show only some embodiments of the present application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application without creative efforts shall fall within the protection scope of the present disclosure.

Figure 1:
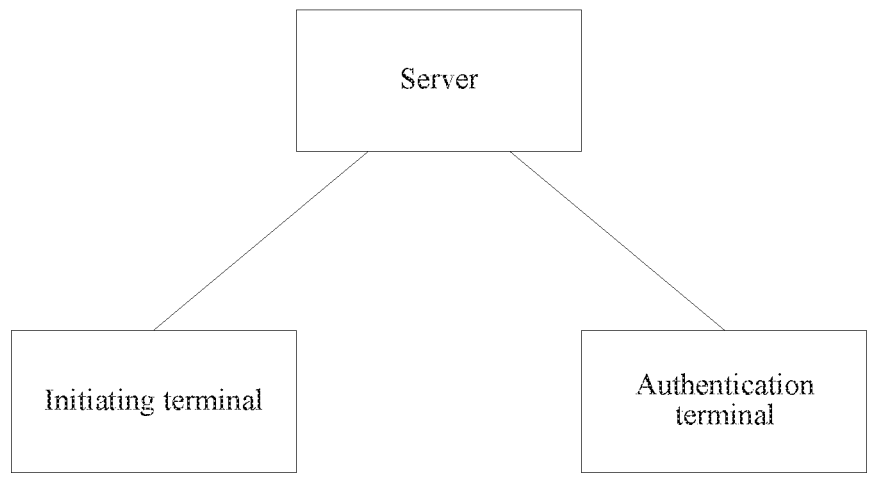
FIG. 1 is a schematic diagram of a network architecture for authentication according to an embodiment of the present application.

For better understanding of an authentication method and device provided in embodiments of the present application, a network architecture to which the embodiments of the present application are applicable is described first. Referring to FIG. 1, FIG. 1 is a schematic diagram of a network architecture for authentication according to an embodiment of the present application. As shown in FIG. 1, the schematic diagram of the network architecture may include an initiating terminal, an authentication terminal, and a server. In the network architecture shown in FIG. 1, when a user logs into a client side of a website or an APP by using the initiating terminal, the initiating terminal may send a login request to the server, where the login request may include an initiating terminal identifier (a first initiating terminal identifier). After receiving the login request sent by the initiating terminal, the server may search, among binding relationships between initiating terminal identifiers, authentication terminal identifiers, and registered biological characteristic information according to the first terminal identifier, a target binding relationship matching the first initiating terminal identifier: and when the target binding relationship exists, the server sends an authentication request to an authentication terminal corresponding to an authentication terminal identifier included in the target binding relationship. After receiving the authentication request, the authentication terminal may obtain, in response to the authentication request, biological characteristic information entered by the user, and send the biological characteristic information to the server. After receiving the biological characteristic information sent by the authentication terminal, the server may determine, through comparison, whether the biological characteristic information is consistent with registered biological characteristic information included in the target binding relationship; and when the biological characteristic information is consistent with the registered biological characteristic information, authenticate the login request. The initiating terminal may include, but is not limited to, a personal computer (PC), a mobile phone, or a tablet computer. The authentication terminal may be, but is not limited to, a terminal having a biological characteristic information collection capability and a wireless communications capability, such as a smart band, a smart watch, or a USB key. The server may be a server implemented by using hardware including one or more processors and memory for storing a plurality of computer executable instructions, such as a server, or may be a server implemented by using software, such as a service system or a combination of both. In some embodiments, the server stores multiple sets of registered biological characteristic information associated with a respective user, each set having one or more parameters characterizing certain biological aspects of the user including, but not limited to, blood pressure, blood sugar level, heartbeat, acoustic footprint, etc., and a collection timestamp indicating when the parameters were collected by an authentication terminal having a corresponding authentication terminal identifier. In response to the authentication request, the user should initiate a new measurement of the biological characteristic information and submit the new measurement to the server. The server then stores the new measurement as a new set of registered biological characteristic information associated with the user after the new measurement is deemed to be consistent with the registered biological characteristic information comprised of the prior measurements of the biological characteristic information. It should be noted that, a new measurement consistent with the registered biological characteristic information does not have to be identical to any of the prior measurements. For example, the new measurement is deemed to be consistent with the registered biological characteristic information when the error between them is smaller than a predefined threshold. For certain types of biological characteristic information (e.g., blood sugar level), the time at which the measurement is collected matters because measurements of the same individual at different times of a day may be significantly different. In this case, the server only uses the collection timestamp as a filter to compare the new measurement with prior measurements that were collected at similar times of a day to improve the accuracy of the comparison. In some embodiments, the server only keeps a predefined number of most recent measurements as registered biological characteristic information by adding new a measurement that passes the authentication test to the registered biological characteristic information and abandoning obsolete measurements. As such, a hacker that has access to the obsolete measurements still cannot pass the authentication test by the server. In some embodiments, during the registration of biological characteristic information with the server, a user provides a sufficient number of measurement samples collected at different times of a day such that the server can predicate an accurate measurement at a certain time of a day when there is no prior registered biological characteristic information close enough to the time at which the actual measurement occurs.

It should be noted that, in the embodiments of the present application, one initiating terminal may be bound to multiple different authentication terminals, and one authentication terminal may also be bound to multiple different initiating terminals. A specific implementation thereof is not described herein.

Figure 2:
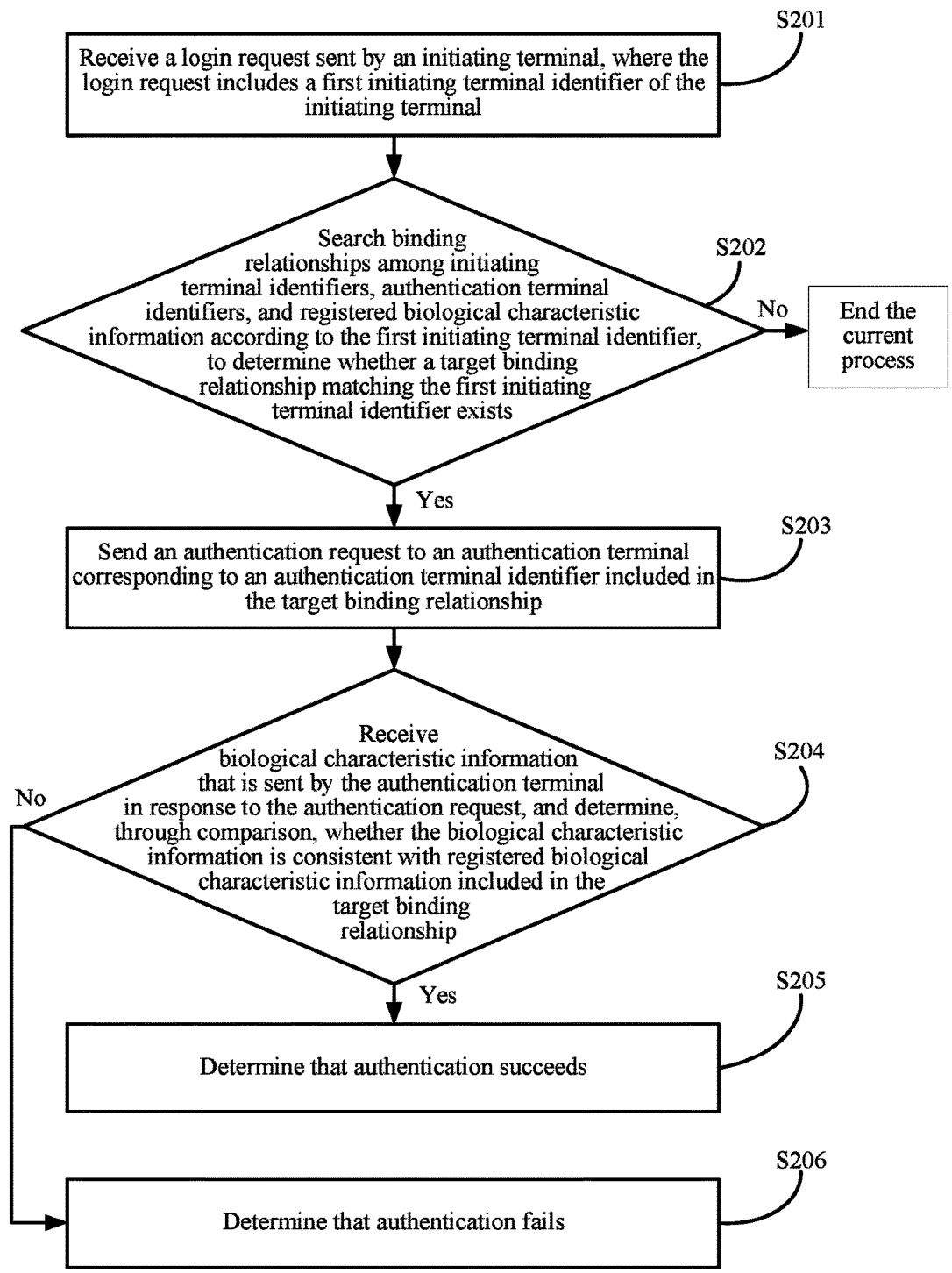
FIG. 2 is a schematic flowchart of an authentication method according to an embodiment of the present application.

Based on the network architecture shown in FIG. 1, an embodiment of the present application provides an authentication method. As shown in FIG. 2, FIG. 2 is a schematic flowchart of the authentication method provided in this embodiment of the present application. The authentication method may include the following steps:

S201: Receive a login request sent by an initiating terminal, where the login request includes a first initiating terminal identifier of the initiating terminal.

In this embodiment of the present application, when a user logs into a website or an APP by using the initiating terminal, the initiating terminal may send the login request to a server, where the login request may include an initiating terminal identifier (the first initiating terminal identifier) of the initiating terminal.

In this embodiment of the present application, the initiating terminal identifier may be identification information that may uniquely identify the initiating terminal, such as an international mobile equipment identity (IMEI) or a Media Access Control (MAC) address.

S202: Search binding relationships between initiating terminal identifiers, authentication terminal identifiers, and registered biological characteristic information according to the first initiating terminal identifier, a target binding relationship matching the first initiating terminal identifier: when the target binding relationship exists, perform step S203: otherwise, end the current process.

In this embodiment of the present application, to improve authentication security, when logging into the website or the APP by using the initiating terminal, the user needs to enter authentication information (biological characteristic information) for authentication by using an authentication terminal bound to the initiating terminal.

Correspondingly, when receiving the login request sent by the initiating terminal, the server may search the binding relationships between initiating terminal identifiers, authentication terminal identifiers, and registered biological characteristic information according to the first terminal identifier included in the login request, to determine whether the target binding relationship matching the first initiating terminal identifier exists. The binding relationships between initiating terminal identifiers, authentication terminal identifiers, and registered biological characteristic information may be stored in the server, or may be stored in a database.

If the server finds the target binding relationship corresponding to the first initiating terminal identifier, steps S203 to S206 may be performed, otherwise, the current process may be ended, or the server may prompt the initiating terminal to be bound to the authentication terminal.

S203: Send an authentication request to an authentication terminal corresponding to an authentication terminal identifier included in the target binding relationship.

In this embodiment of the present application, after finding the target binding relationship matching the first initiating terminal identifier, the server may send the authentication request to the authentication terminal corresponding to the authentication terminal identifier included in the binding relationship.

In this embodiment of the present application, after receiving the authentication request sent by the server, the authentication terminal may obtain the biological characteristic information entered by the user, and send the biological characteristic information to the server. The biological characteristic information includes, but is not limited to, a combination of one or more of fingerprint information, face information, iris information, retina information, or voiceprint information.

In an optional implementation manner, in this embodiment of the present application, when receiving the authentication request sent by the server, the authentication terminal may output prompt information, where the prompt information is used to prompt the user whether to confirm login. For example, the prompt information may be "Logging into a particular website (or application), confirm login?".

When the authentication terminal detects an operation instruction for confirming login from the user (for example, the user clicks a "Confirm" button), the authentication terminal may output an input entry for inputting biological characteristic information. The user may enter the biological characteristic information such as fingerprint information or iris information into the authentication terminal by using the input entry. After obtaining the biological characteristic information entered by the user, the authentication terminal may send the biological characteristic information to the server.

When the authentication terminal does not detect, within a preset time (for example, 10 seconds), the operation instruction for confirming login from the user, or the authentication terminal detects an operation instruction for canceling login from the user (for example, the user clicks a "Cancel" button), the authentication terminal may send a login cancel response to the server. When receiving the login cancel response, the server determines that authentication fails.

S204: Receive biological characteristic information that is sent by the authentication terminal in response to the authentication request, and determine, through comparison, whether the biological characteristic information is consistent with registered biological characteristic information included in the target binding relationship; if yes, perform step S205; otherwise, perform step S206.

S205: Determine that authentication succeeds.

S206: Determine that authentication fails.

In this embodiment of the present application, when receiving the biological characteristic information sent by the authentication terminal, the server may determine, through comparison, whether the biological characteristic information is consistent with the registered biological characteristic information included in the target binding relationship; and when the biological characteristic information is consistent with the registered biological characteristic information, authenticate the login request; otherwise, determine that authentication fails.

The registered biological characteristic information includes, but is not limited to, a combination of one or more of registered fingerprint information, registered face information, registered iris information, registered retina information, or registered voiceprint information.

For example, assuming that the foregoing biological characteristic information is registered fingerprint information, and the registered fingerprint information includes fingerprint string information and an entering time corresponding to each fingerprint, correspondingly, the determining, through comparison, whether the biological characteristic information is consistent with registered biological characteristic information may include the following steps:

determining, through comparison, whether a fingerprint string included in the biological characteristic information is the same as a fingerprint string included in the registered biological characteristic information, and differences between entering times of same fingerprints are all less than a preset value; if the fingerprint string included in the biological characteristic information is the same as the fingerprint string included in the registered biological characteristic information, and the differences between the entering times of the same fingerprints are all less than the preset value, considering that the biological characteristic information is consistent with the registered biological characteristic information; otherwise, considering that the biological characteristic information is inconsistent with the registered biological characteristic information.

In an optional implementation manner, in this embodiment of the present application, if multiple target binding relationships matching the first initiating terminal identifier exist, the foregoing step S203 may include the following steps:

11) sending an authentication terminal identifier list to the initiating terminal, where the authentication terminal identifier list includes authentication terminal identifiers included in the multiple target binding relationships;

12) receiving, from the initiating terminal, a selection request for a target authentication terminal identifier in the authentication terminal identifier list; and 13) sending an authentication request to an authentication terminal corresponding to the target authentication terminal identifier.

Correspondingly, in the foregoing step S204, the determining, through comparison, whether the biological characteristic information is consistent with registered biological characteristic information included in the target binding relationship may include:

determining, through comparison, whether the biological characteristic information is consistent with registered biological characteristic information included in a target binding relationship matching both the target authentication terminal identifier and the first initiating terminal identifier.

In this implementation manner, if the server finds multiple target binding relationships matching the first initiating terminal identifier, the server may send, to the initiating terminal, the authentication terminal identifier list of the authentication terminal identifiers included in the multiple target binding relationships; when receiving the authentication terminal identifier list, the initiating terminal may output the authentication terminal identifier list to the user (for example, to a display of the initiating terminal) for the user to select an authentication terminal for authentication from the authentication terminal identifier list; and when the initiating terminal detects the selection instruction, from the user, for the target authentication terminal identifier in the authentication terminal identifier list, the initiating terminal may send the selection request for the target authentication terminal identifier to the server, so that the server sends the authentication request to the authentication terminal corresponding to the target authentication terminal identifier.

After the server receives the biological characteristic information sent by the authentication terminal corresponding to the target authentication terminal identifier, the server may compare the biological characteristic information with the registered biological characteristic information included in the target binding relationship matching both the foregoing target authentication terminal identifier and the first initiating terminal identifier, to determine whether the biological characteristic information is consistent with the registered biological characteristic information.

For example, it is assumed that binding relationships, stored in the server, among initiating terminal identifiers, authentication terminal identifiers, and registered biological characteristic information are shown in Table 1.

TABLE 1

| Initiating terminal identifier | Authentication terminal identifier | Registered biological characteristic information |
|---|---|---|
| Initiating terminal A | Authentication terminal A | Registered biological characteristic information 1 |
| | Authentication terminal B | Registered biological characteristic information 2 |
| | Authentication terminal C | Registered biological characteristic information 3 |
| Initiating terminal B | Authentication terminal D | Registered biological characteristic information 4 |
| ... | ... | ... |

If the first initiating terminal identifier indicates the initiating terminal A (assuming that an initiating terminal corresponding to the first initiating terminal identifier is the initiating terminal A), when searching for, according to the first initiating terminal identifier, a target binding relationship matching the first initiating terminal identifier, the server may find three target binding relationships: "Initiating terminal A-Authentication terminal A-Registered biological characteristic information 1", "Initiating terminal A-Authentication terminal B-Registered biological characteristic information 2", and "Initiating terminal A-Authentication terminal C-Registered biological characteristic information 3". The server may send, to the initiating terminal A, an authentication terminal identifier list of the authentication terminal identifiers included in the multiple target binding relationships, as shown in Table 2.

TABLE 2

Authentication terminal A
Authentication terminal B
Authentication terminal C

When receiving the authentication terminal identifier list, the initiating terminal A may present the authentication terminal identifier list to the user for the user to select an authentication terminal for authentication. Assuming that the user selects the authentication terminal B, the initiating terminal A may send a selection request for the authentication terminal B to the server. When receiving the selection request, the server may send an authentication request to an authentication terminal corresponding to the authentication terminal B (assuming that the authentication terminal is the authentication terminal B).

When receiving biological characteristic information sent by the authentication terminal B, the server may compare the biological characteristic information with registered biological cal characteristic information (that is, the registered biological characteristic information 2) matching both the initiating terminal A and the authentication terminal B, to determine whether the biological characteristic information is consistent with the registered biological characteristic information 2.

It should be noted that, the foregoing implementation manner is merely a processing manner when multiple target binding relationships matching the first initiating terminal identifier exist, rather than limitation to the protection scope of the present disclosure. That is, in this embodiment of the present application, if multiple target binding relationships matching the first initiating terminal identifier exist, the server may also send, in another manner, an authentication request to authentication terminals corresponding to authentication terminal identifiers included in the target binding relationships. For example, the server may separately send an authentication request to the authentication terminals corresponding to the authentication terminal identifiers included in the target binding relationships, or may randomly send an authentication request to one of the authentication terminals corresponding to the authentication terminal identifiers included in the target binding relationships. Correspondingly, when biological characteristic information authentication is performed, biological characteristic information sent by a particular authentication terminal needs to be compared with registered biological characteristic information in a binding relationship matching both an authentication terminal identifier of the authentication terminal and the first initiating terminal identifier. A specific implementation manner is not described herein.

It can be seen that, in the process of the method described in FIG. 1, an initiating terminal, an authentication terminal, and biological characteristic information are bound, so that when a server receives a login request sent by an initiating terminal, the server may first determine, according to an initiating terminal identifier, whether the initiating terminal is bound to an authentication terminal, and if yes, send an authentication request to the authentication terminal bound to the initiating terminal, and authenticate, according to registered biological characteristic information that is bound to the initiating terminal and the authentication terminal, biological characteristic information sent by the authentication terminal, to determine whether authentication succeeds. That is, when a user initiates login by using an initiating terminal, authentication succeeds only when the user enters, by using an authentication terminal bound to the initiating terminal, biological characteristic information matching registered biological characteristic information, thereby improving authentication security.

In the embodiments of the present application, a binding relationship among an initiating terminal identifier, an authentication terminal identifier, and biological characteristic information may be pre-configured and stored in a server or a database, or may be dynamically established in real time through interaction among an initiating terminal, an authentication terminal, and a server.

Figure 3:
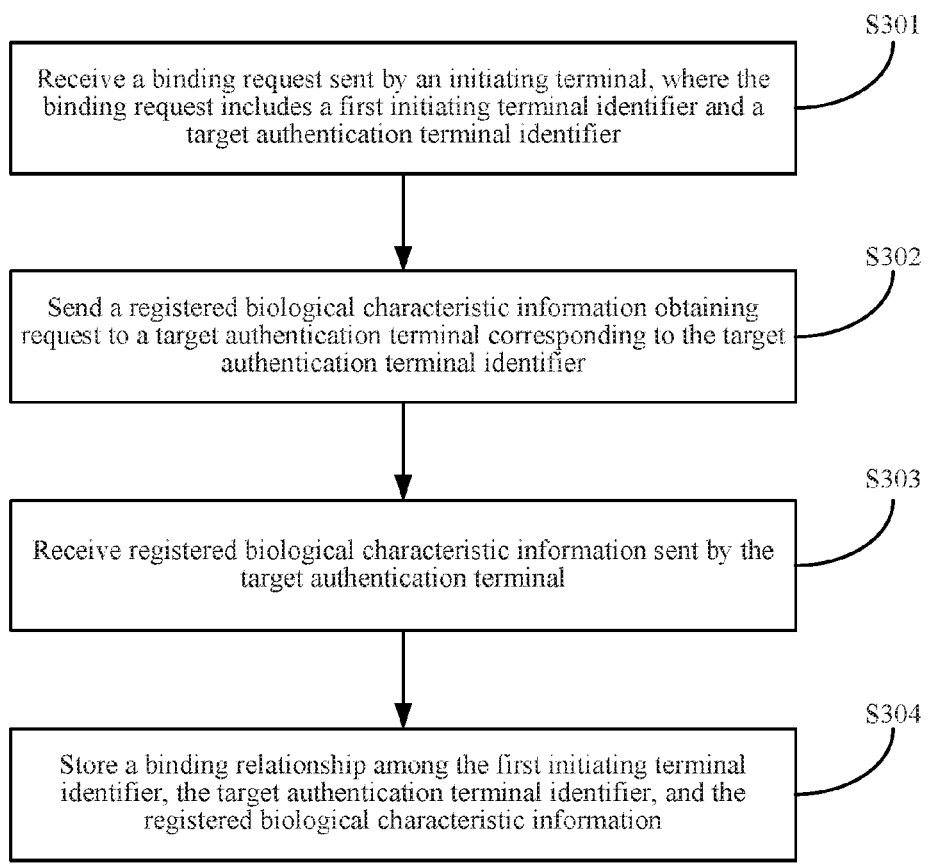
FIG. 3 is a schematic flowchart of binding relationship establishment according to an embodiment of the present application.

Based on the network architecture shown in FIG. 1, an embodiment of the present application provides a binding relationship establishment method. As shown in FIG. 3, FIG. 3 is a schematic flowchart of the binding relationship establishment method provided in this embodiment of the present application. The binding relationship establishment method may include the following steps:

S301: Receive a binding request sent by an initiating terminal, where the binding request includes a first initiating terminal identifier and a target authentication terminal identifier.

In this embodiment of the present application, to improve authentication security, when a user intends to log into a website or an APP in the initiating terminal, the user may send a binding request to a server by using the initiating terminal, to bind the initiating terminal to a specified authentication terminal.

For example, the user may trigger, by selecting a "Bind" option on a login interface of the website or the APP by using the initiating terminal, the initiating terminal to send a binding request to the server. When the initiating terminal detects a selection instruction, from the user, for the "Bind" option on the login interface of the website or the APP, the initiating terminal may output a prompt message, where the prompt message is used to prompt the user to enter an authentication terminal identifier (which is used to uniquely identify the authentication terminal, for example, a device serial number of the authentication terminal) of an authentication terminal requesting to be bound to the initiating terminal. After receiving the authentication terminal identifier that is entered by the user in response to the prompt message, the initiating terminal may send the binding request to the server, where the binding request may include the initiating terminal identifier (for example, the first initiating terminal identifier) of the initiating terminal and the authentication terminal identifier (that is, the target authentication terminal identifier).

S302: Send a registered biological characteristic information obtaining request to a target authentication terminal corresponding to the target authentication terminal identifier.

In this embodiment of the present application, after receiving the binding request sent by the initiating terminal, the server may send, according to the target authentication terminal identifier included in the binding request, the registered biological characteristic information obtaining request to the target authentication terminal corresponding to the target authentication terminal identifier.

S303: Receive registered biological characteristic information sent by the target authentication terminal.

In this embodiment of the present application, after receiving the registered biological characteristic information obtaining request sent by the server, the target authentication terminal may output a prompt message, where the prompt message is used to prompt the user to enter biological characteristic information. After receiving the biological characteristic information that is entered by the user in response to the prompt message, the target authentication terminal may use the biological characteristic information as the registered biological characteristic information and send the biological characteristic information to the server.

S304: Store a binding relationship among the first initiating terminal identifier, the target authentication terminal identifier, and the registered biological characteristic information.

In this embodiment of the present application, after receiving the registered biological characteristic information sent by the target authentication terminal, the server may establish a binding relationship among the first initiating terminal identifier, the target authentication terminal identifier, and the registered biological characteristic information, and store the binding relationship into binding relationships, stored locally and/or in a database, among initiating terminal identifiers, authentication terminal identifiers, and registered biological characteristic information.

Figure 4:
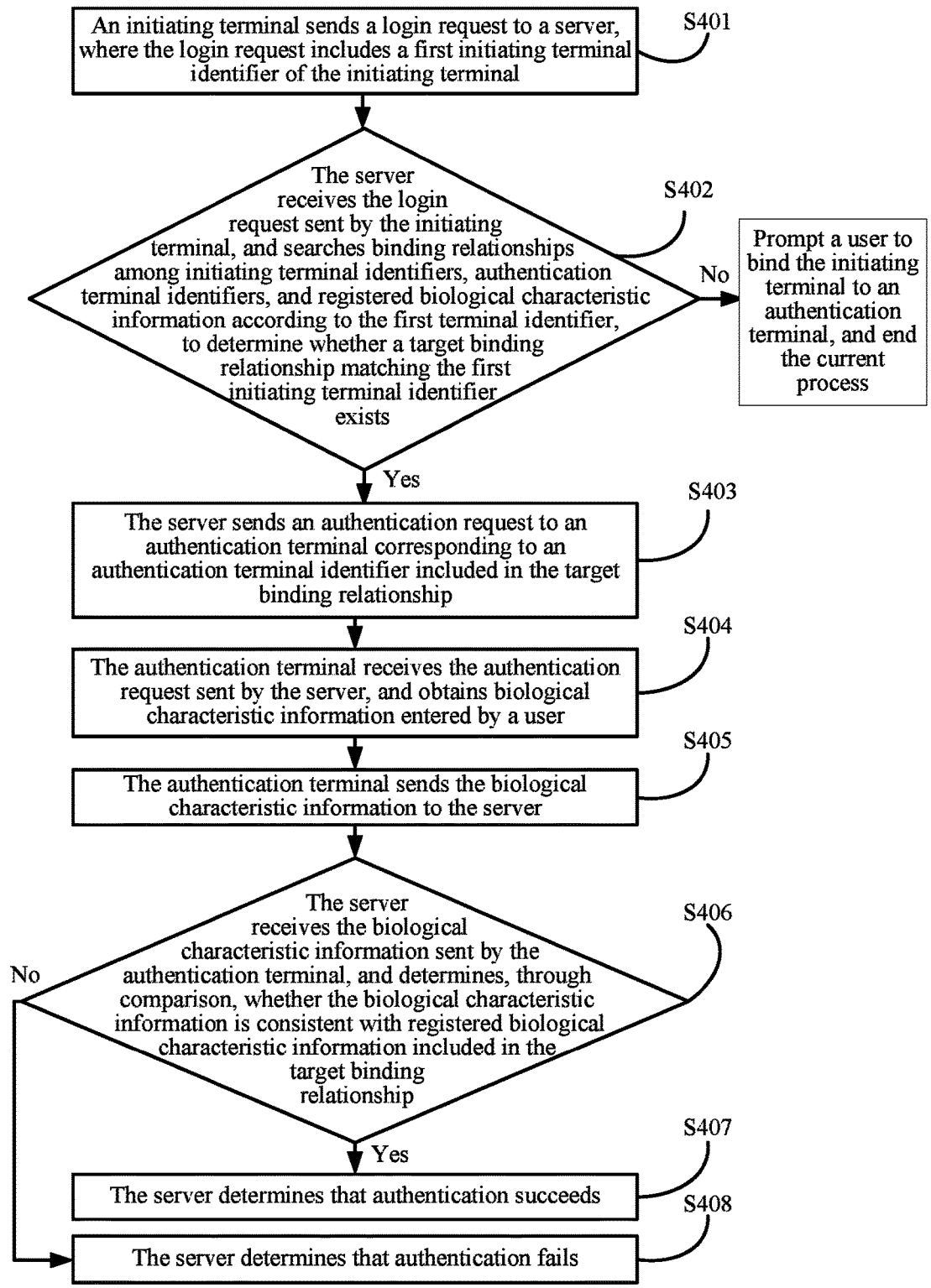
FIG. 4 is a schematic flowchart of another authentication method according to an embodiment of the present application.

Based on the network architecture shown in FIG. 1, an embodiment of the present application provides another authentication method. As shown in FIG. 4, FIG. 4 is a schematic flowchart of another authentication method provided in this embodiment of the present application. The authentication method may include the following steps:

S401: An initiating terminal sends a login request to a server, where the login request includes a first initiating terminal identifier of the initiating terminal.

In this embodiment of the present application, when a user logs into a website or an APP by using the initiating terminal, the initiating terminal may send the login request to the server, where the login request may include an initiating terminal identifier (the first initiating terminal identifier) of the initiating terminal.

S402: The server receives the login request sent by the initiating terminal, and searches, among binding relationships between initiating terminal identifiers, authentication terminal identifiers, and registered biological characteristic information according to the first terminal identifier, a target binding relationship matching the first initiating terminal identifier: if yes, performs step S403; otherwise, prompts the user to bind the initiating terminal to an authentication terminal, and ends the current process.

In this embodiment of the present application, for a specific implementation of binding the initiating terminal to the authentication terminal by the user, refer to the related descriptions in the foregoing steps S301 to S304, and details are not described herein again.

S403: The server sends an authentication request to an authentication terminal corresponding to an authentication terminal identifier included in the target binding relationship.

S404: The authentication terminal receives the authentication request sent by the server, and obtains biological characteristic information entered by a user.

S405: The authentication terminal sends the biological characteristic information to the server.

S406: The server receives the biological characteristic information sent by the authentication terminal, and determines, through comparison, whether the biological characteristic information is consistent with registered biological characteristic information included in the target binding relationship; if yes, performs step S407; otherwise, performs step S408.

S407: The server determines that authentication succeeds.

S408: The server determines that authentication fails.

In this embodiment of the present application, for a specific implementation of the foregoing steps S402 to S408, refer to the related descriptions in the foregoing steps S201 to S206, and details are not described herein again.

It can be known from the foregoing description that, in the technical solution provided in this embodiment of the present application, an initiating terminal, an authentication terminal, and biological characteristic information are bound, so that when a server receives a login request sent by an initiating terminal, the server may first determine, according to an initiating terminal identifier, whether the initiating terminal is bound to an authentication terminal, and if yes, send an authentication request to the authentication terminal bound to the initiating terminal, and authenticate, according to registered biological characteristic information that is bound to the initiating terminal and the authentication terminal, biological characteristic information sent by the authentication terminal, to determine whether authentication succeeds. That is, when a user initiates login by using an initiating terminal, authentication succeeds only when the user enters, by using an authentication terminal bound to the initiating terminal, biological characteristic information matching registered biological characteristic information, thereby improving authentication security.

Apparatus embodiments of the present application are described below. The apparatus embodiments of the present application share the same concept with the method embodiments of the present application, and are used to execute the methods described in the method embodiments of the present application. For ease of description, only parts related to the apparatus embodiments of the present application are described in the apparatus embodiments of the present application. For specific technical details that are not disclosed, refer to the descriptions in the method embodiments of the present application, and the details are not described herein again.

Figure 5:
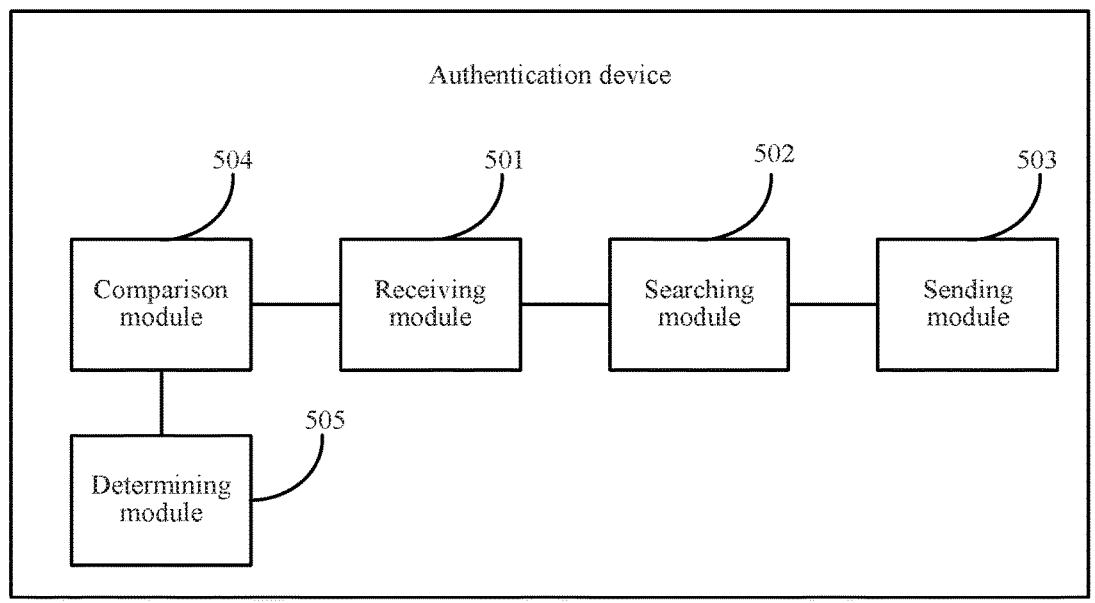
FIG. 5 is a schematic structural diagram of an authentication device according to an embodiment of the present application.

As shown in FIG. 5, FIG. 5 is a schematic structural diagram of an authentication device according to an embodiment of the present application. The authentication device may be applied to the server in the network architecture shown in FIG. 1. The authentication device may include:

a receiving module 501, configured to receive a login request sent by an initiating terminal, the login request including a first initiating terminal identifier of the initiating terminal;

a searching module 502, configured to search, among binding relationships between initiating terminal identifiers, authentication terminal identifiers, and registered biological characteristic information according to the first terminal identifier, a target binding relationship matching the first initiating terminal identifier;

a sending module 503, configured to: if a searching result of the searching module 502 indicates that the target binding relationship exists, send an authentication request to an authentication terminal corresponding to an authentication terminal identifier included in the target binding relationship, the receiving module 501 being further configured to receive biological characteristic information that is sent by the authentication terminal in response to the authentication request;

a comparison module 504, configured to determine, through comparison, whether the biological characteristic information is consistent with registered biological characteristic information included in the target binding relationship: and a determining module 505, configured to: if a comparison result of the comparison module 504 indicates that the biological characteristic information is consistent with the registered biological characteristic information, authenticate the login request.

In an optional embodiment, the determining module 505 may be further configured to: if the receiving module 501 does not receive the biological characteristic information sent by the authentication terminal, or receives a login cancel response message sent by the authentication terminal, determine that authentication fails.

Figure 6:
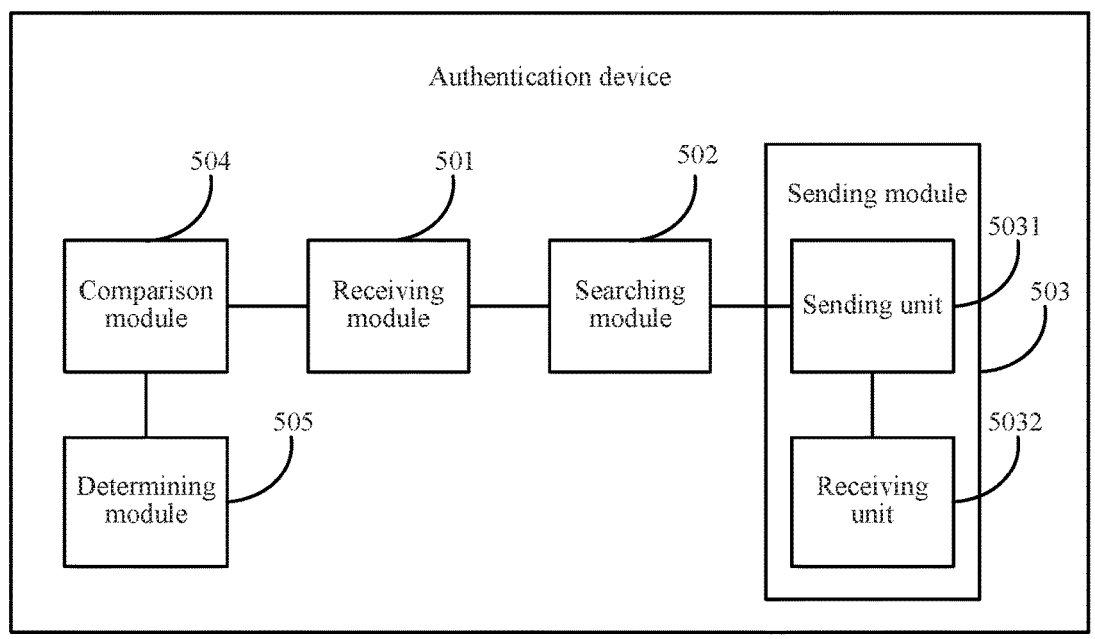
FIG. 6 is a schematic structural diagram of another authentication device according to an embodiment of the present application.

Also referring to FIG. 6, FIG. 6 is a schematic structural diagram of another authentication device according to an embodiment of the present application. The authentication device shown in FIG. 6 is obtained by optimizing the authentication device shown in FIG. 5. Compared with the authentication device shown in FIG. 5, in the authentication device shown in FIG. 6, the sending module 503 may include:

a sending unit 5031, configured to: when the target binding relationship includes multiple target binding relationships, send an authentication terminal identifier list to the initiating terminal, where the authentication terminal identifier list includes authentication terminal identifiers included in the multiple target binding relationships; and a receiving unit 5032, configured to receive, from the initiating terminal, a selection request for a target authentication terminal identifier in the authentication terminal identifier list, where the sending unit 5031 is further configured to send an authentication request to an authentication terminal corresponding to the target authentication terminal identifier.

In an optional embodiment, the comparison module 504 may be specifically configured to determine, through comparison, whether the biological characteristic information is consistent with registered biological characteristic information included in a target binding relationship matching both the target authentication terminal identifier and the first initiating terminal identifier.

In an optional embodiment, the receiving module 501 may be further configured to receive a binding request sent by the initiating terminal, where the binding request includes the first initiating terminal identifier and a target authentication terminal identifier;

the sending module 503 may be further configured to send a registered biological characteristic information obtaining request to a target authentication terminal corresponding to the target authentication terminal identifier; and the receiving module 501 may be further configured to receive registered biological characteristic information sent by the target authentication terminal.

Figure 7:
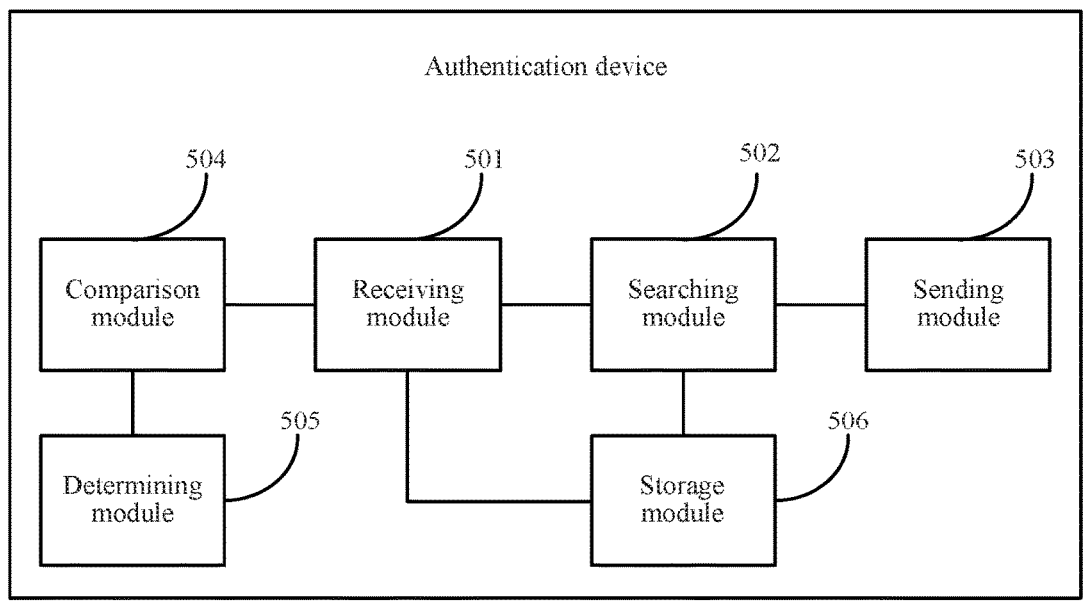
FIG. 7 is a schematic structural diagram of another authentication device according to an embodiment of the present application.

Correspondingly, also referring to FIG. 7, FIG. 7 is a schematic structural diagram of another authentication device according to an embodiment of the present application. The authentication device shown in FIG. 7 is obtained by optimizing the authentication device shown in FIG. 5. Compared with the authentication device shown in FIG. 5, the authentication device shown in FIG. 7 may further include:

a storage module 506, configured to store a binding relationship among the first initiating terminal identifier, the target authentication terminal identifier, and the registered biological characteristic information.

Figure 8:
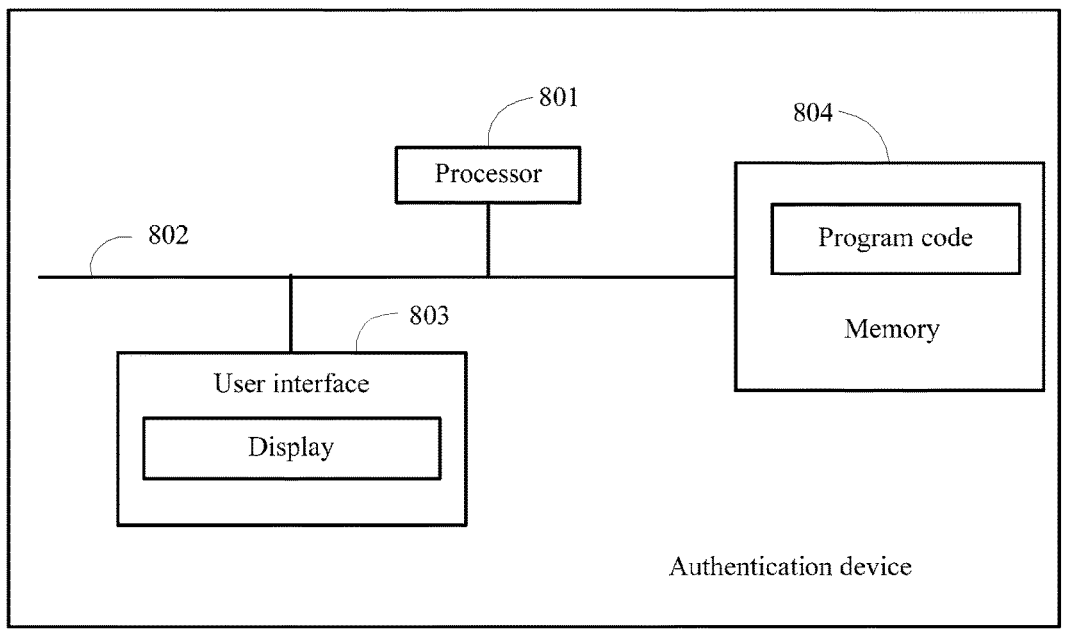
FIG. 8 is a schematic structural diagram of another authentication device according to an embodiment of the present application.

Referring to FIG. 8, FIG. 8 is a schematic structural diagram of another authentication device according to an embodiment of the present application. As shown in FIG. 8, the authentication device may include at least one processor 801, for example, a CPU, a user interface 803, a memory 804, and at least one communications bus 802. The communications bus 802 is configured to implement connection and communication between these components. The user interface 803 may include a display. Optionally, the user interface 803 may also include a standard wired interface or wireless interface. The memory 804 may be a high-speed random access memory (RAM), or may be a non-volatile memory, for example, at least one magnetic disk memory. Optionally, the memory 804 may also be at least one storage device located away from the processor 801. The memory 804 stores a group of program code, and the processor 801 invokes the program code stored in the memory 804, to execute the following operations:

receiving a login request sent by an initiating terminal, the login request including a first initiating terminal identifier of the initiating terminal;

searching, among binding relationships between initiating terminal identifiers, authentication terminal identifiers, and registered biological characteristic information according to the first terminal identifier, a target binding relationship matching the first initiating terminal identifier;

when the target binding relationship exists, sending an authentication request to an authentication terminal corresponding to an authentication terminal identifier included in the target binding relationship:

receiving biological characteristic information that is sent by the authentication terminal in response to the authentication request, and determining, through comparison, whether the biological characteristic information is consistent with registered biological characteristic information included in the target binding relationship; and when the biological characteristic information is consistent with the registered biological characteristic information, authenticating the login request.

In an optional embodiment, the processor 801 invokes the program code stored in the memory 804, to execute the following operations:

when the target binding relationship includes multiple target binding relationships, the sending an authentication request to an authentication terminal corresponding to an authentication terminal identifier included in the target binding relationship includes:

sending an authentication terminal identifier list to the initiating terminal, where the authentication terminal identifier list includes authentication terminal identifiers included in the multiple target binding relationships;

receiving, from the initiating terminal, a selection request for a target authentication terminal identifier in the authentication terminal identifier list; and sending an authentication request to an authentication terminal corresponding to the target authentication terminal identifier.

In an optional embodiment, that the processor 801 invokes the program code stored in the memory 804, to determine, through comparison, whether the biological characteristic information is consistent with the registered biological characteristic information included in the target binding relationship may specifically include:

determining, through comparison, whether the biological characteristic information is consistent with registered biological characteristic information included in a target binding relationship matching both the target authentication terminal identifier and the first initiating terminal identifier.

In an optional embodiment, after the processor 801 invokes the program code stored in the memory 804, to send the authentication request to the authentication terminal corresponding to the authentication terminal identifier included in the target binding relationship, the processor 801 invokes the program code stored in the memory 804, to further execute the following operation:

when the biological characteristic information sent by the authentication terminal is not received, or a login cancel response message sent by the authentication terminal is received, denying the login request.

In an optional embodiment, before the processor 801 invokes the program code stored in the memory 804, to receive the login request sent by the initiating terminal, the processor 801 invokes the program code stored in the memory 804, to further execute the following operations:

receiving a binding request sent by the initiating terminal, where the binding request includes the first initiating terminal identifier and a target authentication terminal identifier;

sending a registered biological characteristic information obtaining request to a target authentication terminal corresponding to the target authentication terminal identifier;

receiving registered biological characteristic information sent by the target authentication terminal; and storing a binding relationship among the first initiating terminal identifier, the target authentication terminal identifier, and the registered biological characteristic information.

In the descriptions of this specification, descriptions using reference terms "an embodiment". "some embodiments", "an example". "a specific example", or "some examples" mean that specific characteristics, structures, materials, or features described with reference to the embodiment or example are included in at least one embodiment or example of the present application. In this specification, illustrative expressions using the foregoing terms do not necessarily indicate the same embodiments or examples. Moreover, the described specific characteristics, structures, materials, or features may be combined in an appropriate manner in any embodiment or example or multiple embodiments or examples. In addition, in a case of no contradictions, a person skilled in the art may join or combine different embodiments or examples and features of different embodiments or examples that are described in this specification.

In addition, terms "first" and "second" are for purpose of description only, and should not be understood as indicating or implying relative importance or implicitly indicating the number of indicated technical features. Therefore, a feature defined by "first" or "second" may explicitly or implicitly include at least one such feature. In the descriptions of the present disclosure, unless explicitly specified. "multiple" means at least two, for example, two or three.

Description of any process or method that is described in a flowchart or in other manners herein may be understood as including one or more modules, segments, or parts including code of executable instructions for performing steps for implementing specific logical functions or processes, and the scope of preferred implementation manners of the present application includes other implementations in which functions may be performed in another order including in a substantially simultaneous manner according to related functions or an order reverse to the shown or discussed order, instead of the shown or discussed order. This should be understood by a person skilled in the art to which the embodiments of the present application relate.

Logics and/or steps that are indicated in a flowchart or described in other manners herein may be, for example, considered as a sequencing list of executable instructions for implementing logical functions, and may be specifically implemented in any non-transitory computer readable medium for use by an instruction execution system, apparatus, or device (for example, a computer-based system, a system including a processor, or another system that can obtain instructions from an instruction execution system, apparatus, or device and execute the instructions), or for use in combination with such an instruction execution system, apparatus, or device. In this specification, the "computer readable medium" may be any apparatus that can contain, store, communicate, spread, or transmit programs for use by an instruction execution system, apparatus, or device, or for use in combination with such an instruction execution system, apparatus, or device. More specific examples (a non-exhaustive list) of computer readable media include the following: an electrical connection component (electronic means) having one or more wires, a portable computer enclosure (magnetic means), a RAM, a read-only memory (ROM), an erasable programmable read-only memory (EPROM or flash memory), an optical means, and a compact-disk read-only memory (CD-ROM). In addition, the computer readable medium may even be paper on which the program can be printed, or another appropriate medium, as the program can be obtained in an electronic manner, for example, by performing optical scanning on the paper or the another medium, and then performing editing and parsing, or performing processing in other appropriate manners when necessary, and then the program can be stored in a computer memory.

It should be understood that, parts of the present disclosure can be implemented by using hardware, software, firmware, or a combination thereof. In the foregoing implementation manner, multiple steps or methods may be implemented by using software or firmware that is stored in a memory and executed by an appropriate instruction execution system. For example, if the steps or methods are implemented by using hardware, same as in another implementation manner, the steps or methods can be implemented by using any of or a combination of the following technologies known in the art: a discrete logical circuit having logical gate circuits for performing logical functions on data signals, an application-specific integrated circuit having appropriate combination logical gate circuits, a programmable gate array (PGA), a field programmable gate array (FPGA), or the like.

A person of ordinary skill in the art may understand that implementation of all or some of the steps in the methods in the foregoing embodiments may be implemented by a program instructing related hardware. The program may be stored in a computer readable storage medium, and when the program is executed, one of or a combination of the steps in the method embodiments are performed.

In addition, the functional modules in the embodiments of the present application may be integrated into one processing module, or each of the units may exist alone physically, or two or more units may be integrated into one module. The integrated module may be implemented in a form of hardware, or may be implemented in a form of a software functional module. If implemented in the form of a software functional module and sold or used as an independent product, the integrated module may also be stored in a computer readable storage medium.

The foregoing mentioned storage medium may be a ROM, a magnetic disk, an optical disc, or the like. Although the embodiments of the present application have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. An authentication method performed at a server having one or more processors and memory storing a plurality of program modules to be executed by the one or more processors, the method comprising:
    receiving a login request sent by an initiating terminal, the login request comprising a first initiating terminal identifier of the initiating terminal;
    searching, among binding relationships between initiating terminal identifiers, authentication terminal identifiers, and registered biological characteristic information according to the first terminal identifier, a target binding relationship matching the first initiating terminal identifier;
    when the target binding relationship exists, sending an authentication request to an authentication terminal corresponding to an authentication terminal identifier comprised in the target binding relationship;
    receiving biological characteristic information that is sent by the authentication terminal in response to the authentication request, and determining, through comparison, whether the biological characteristic information is consistent with registered biological characteristic information comprised in the target binding relationship, wherein the biological characteristic information that is sent by the authentication terminal is associated with a timestamp indicating when the biological characteristic information was collected by the authentication terminal and the timestamp is used for selecting a subset of the registered biological characteristic information for comparison with the biological characteristic information; and when the biological characteristic information is consistent with the registered biological characteristic information, authenticating the login request;

adding the biological characteristic information to the registered biological characteristic information comprised in the target binding relationship; and deleting a subset of the registered biological characteristic information deemed obsolete according to its respective timestamp if the size of the registered biological characteristic information exceeds a predefined threshold.

2. The method according to claim 1, wherein, when the target binding relationship includes multiple target binding relationships, the operation of sending an authentication request to an authentication terminal corresponding to an authentication terminal identifier comprised in the target binding relationship comprises:

sending an authentication terminal identifier list to the initiating terminal, wherein the authentication terminal identifier list comprises authentication terminal identifiers comprised in the multiple target binding relationships;

receiving, from the initiating terminal, a selection request for a target authentication terminal identifier in the authentication terminal identifier list; and sending an authentication request to an authentication terminal corresponding to the target authentication terminal identifier.

3. The method according to claim 2, wherein the operation of determining, through comparison, whether the biological characteristic information is consistent with registered biological characteristic information comprised in the target binding relationship comprises:

determining, through comparison, whether the biological characteristic information is consistent with registered biological characteristic information comprised in a target binding relationship matching both the target authentication terminal identifier and the first initiating terminal identifier.

4. The method according to claim 1, further comprising:

after sending an authentication request to an authentication terminal corresponding to an authentication terminal identifier comprised in the target binding relationship:

when the biological characteristic information sent by the authentication terminal is not received, or a login cancel response message sent by the authentication terminal is received, denying the login request.

5. The method according to claim 1, further comprising:

before receiving the login request sent by the initiating terminal:

receiving a binding request sent by the initiating terminal, wherein the binding request comprises the first initiating terminal identifier and a target authentication terminal identifier;

sending a registered biological characteristic information obtaining request to a target authentication terminal corresponding to the target authentication terminal identifier;

receiving registered biological characteristic information sent by the target authentication terminal; and storing a binding relationship among the first initiating terminal identifier, the target authentication terminal identifier, and the registered biological characteristic information.

6. A server having one or more processors, memory, and a plurality of program modules stored in the memory and to be executed by the one or more processors, the plurality of program modules further comprising:

a receiving module, configured to receive a login request sent by an initiating terminal, the login request comprising a first initiating terminal identifier of the initiating terminal;

a searching module, configured to search, among binding relationships between initiating terminal identifiers, authentication terminal identifiers, and registered biological characteristic information according to the first terminal identifier, a target binding relationship matching the first initiating terminal identifier;

a sending module, configured to: if a searching result of the searching module indicates that the target binding relationship exists, send an authentication request to an authentication terminal corresponding to an authentication terminal identifier comprised in the target binding relationship, the receiving module being further configured to receive biological characteristic information that is sent by the authentication terminal in response to the authentication request;

a comparison module, configured to determine, through comparison, whether the biological characteristic information is consistent with registered biological characteristic information comprised in the target binding relationship, wherein the biological characteristic information that is sent by the authentication terminal is associated with a timestamp indicating when the biological characteristic information was collected by the authentication terminal and the timestamp is used for selecting a subset of the registered biological characteristic information for comparison with the biological characteristic information; and a determining module, configured to: if a comparison result of the comparison module indicates that the biological characteristic information is consistent with the registered biological characteristic information, authenticate the login request;

adding the biological characteristic information to the registered biological characteristic information comprised in the target binding relationship; and deleting a subset of the registered biological characteristic information deemed obsolete according to its respective timestamp if the size of the registered biological characteristic information exceeds a predefined threshold.

7. The server according to claim 6, wherein the sending module further comprises:

a sending unit, configured to: when the target binding relationship includes multiple target binding relationships, send an authentication terminal identifier list to the initiating terminal, wherein the authentication terminal identifier list comprises authentication terminal identifiers comprised in the multiple target binding relationships; and a receiving unit, configured to receive, from the initiating terminal, a selection request for a target authentication terminal identifier in the authentication terminal identifier list, wherein the sending unit is further configured to send an authentication request to an authentication terminal corresponding to the target authentication terminal identifier.

8. The server according to claim 6, wherein
the comparison module is specifically configured to determine, through comparison, whether the biological characteristic information is consistent with registered biological characteristic information comprised in a target binding relationship matching both the target authentication terminal identifier and the first initiating terminal identifier.

9. The server according to claim 6, wherein
the determining module is further configured to: if the receiving module does not receive the biological characteristic information sent by the authentication terminal, or receives a login cancel response message sent by the authentication terminal, determine that authentication fails.

10. The server according to claim 6, wherein
the receiving module is further configured to receive a binding request sent by the initiating terminal, wherein the binding request comprises the first initiating terminal identifier and a target authentication terminal identifier;
the sending module is further configured to send a registered biological characteristic information obtaining request to a target authentication terminal corresponding to the target authentication terminal identifier;
the receiving module is further configured to receive registered biological characteristic information sent by the target authentication terminal; and
the device further comprises:
a storage module, configured to store a binding relationship among the first initiating terminal identifier, the target authentication terminal identifier, and the registered biological characteristic information.

11. A non-transitory computer storage medium storing a plurality of computer executable instructions, wherein the plurality of computer executable instructions, when executed by a server having one or more processors, cause the one or more processors to:
receive a login request sent by an initiating terminal, the login request comprising a first initiating terminal identifier of the initiating terminal;
search, among binding relationships between initiating terminal identifiers, authentication terminal identifiers, and registered biological characteristic information according to the first terminal identifier, a target binding relationship matching the first initiating terminal identifier;
when the target binding relationship exists, send an authentication request to an authentication terminal corresponding to an authentication terminal identifier comprised in the target binding relationship;
receive biological characteristic information that is sent by the authentication terminal in response to the authentication request, and determine, through comparison, whether the biological characteristic information is consistent with registered biological characteristic information comprised in the target binding relationship, wherein the biological characteristic information that is sent by the authentication terminal is associated with a timestamp indicating when the biological characteristic information was collected by the authentication terminal and the timestamp is used for selecting a subset of the registered biological characteristic information for comparison with the biological characteristic information; and
when the biological characteristic information is consistent with the registered biological characteristic information,
authenticate the login request;
add the biological characteristic information to the registered biological characteristic information comprised in the target binding relationship; and
delete a subset of the registered biological characteristic information deemed obsolete according to its respective timestamp if the size of the registered biological characteristic information exceeds a predefined threshold.

12. The non-transitory computer storage medium according to claim 11, wherein the one or more processors are configured to:
when the target binding relationship includes multiple target binding relationships:
send an authentication terminal identifier list to the initiating terminal, wherein the authentication terminal identifier list comprises authentication terminal identifiers comprised in the multiple target binding relationships;
receive, from the initiating terminal, a selection request for a target authentication terminal identifier in the authentication terminal identifier list; and
send an authentication request to an authentication terminal corresponding to the target authentication terminal identifier.

13. The non-transitory computer storage medium according to claim wherein the one or more processors are configured to:
after sending an authentication request to an authentication terminal corresponding to an authentication terminal identifier comprised in the target binding relationship:
when the biological characteristic information sent by the authentication terminal is not received, or a login cancel response message sent by the authentication terminal is received, deny the login request.

14. The non-transitory computer storage medium according to claim 11, wherein the one or more processors are configured to:
before receiving the login request sent by the initiating terminal:
receive a binding request sent by the initiating terminal, wherein the binding request comprises the first initiating terminal identifier and a target authentication terminal identifier;
send a registered biological characteristic information obtaining request to a target authentication terminal corresponding to the target authentication terminal identifier;
receive registered biological characteristic information sent by the target authentication terminal; and
store a binding relationship among the first initiating terminal identifier, the target authentication terminal identifier, and the registered biological characteristic information.

\* \* \* \* \*